(12) United States Patent
Toschlog

(10) Patent No.: US 11,805,765 B1
(45) Date of Patent: Nov. 7, 2023

(54) CENTRIFUGAL PUMP SYSTEM

(71) Applicant: Bradley Toschlog, Titusville, FL (US)

(72) Inventor: Bradley Toschlog, Titusville, FL (US)

( * ) Notice: Subject to any disclaimer, the term of this patent is extended or adjusted under 35 U.S.C. 154(b) by 0 days.

(21) Appl. No.: 18/106,576

(22) Filed: Feb. 7, 2023

(51) Int. Cl.
| | | |
|---|---|---|
| *A01K 79/00* | (2006.01) | |
| *F04D 29/22* | (2006.01) | |
| *F04D 1/00* | (2006.01) | |
| *F04D 13/16* | (2006.01) | |
| *A01K 63/00* | (2017.01) | |
| *F04D 29/42* | (2006.01) | |
| *F04D 3/02* | (2006.01) | |
| *F04D 13/00* | (2006.01) | |
| *F04D 29/54* | (2006.01) | |
| *F04D 3/00* | (2006.01) | |
| *F04D 13/06* | (2006.01) | |

(52) U.S. Cl.
CPC ............ *A01K 79/00* (2013.01); *A01K 63/006* (2013.01); *F04D 1/00* (2013.01); *F04D 3/00* (2013.01); *F04D 3/02* (2013.01); *F04D 13/00* (2013.01); *F04D 13/16* (2013.01); *F04D 29/2216* (2013.01); *F04D 29/4293* (2013.01); *F04D 29/548* (2013.01); *F04D 13/06* (2013.01)

(58) Field of Classification Search
CPC ........ A01K 79/00; A01K 63/006; F04D 3/02; F04D 3/00; F04D 29/548; F04D 13/00; F04D 1/00; F04D 13/16; F04D 29/2216; F04D 29/4293; F04D 13/06
See application file for complete search history.

(56) References Cited

U.S. PATENT DOCUMENTS

| | | | | |
|---|---|---|---|---|
| 314,489 | A * | 3/1885 | Thiery | F04B 19/10 416/177 |
| 1,618,338 | A * | 2/1927 | Hoffman | F04D 3/02 415/72 |
| 2,881,707 | A * | 4/1959 | Thompson | F04D 3/00 415/143 |
| 3,228,344 | A | 1/1966 | Cooper | |
| 3,230,890 | A | 1/1966 | Yokota | |
| 3,244,109 | A | 4/1966 | Barske | |
| 3,416,456 | A | 12/1968 | Pollack | |
| 3,768,193 | A * | 10/1973 | London | A01K 71/00 43/6.5 |
| 4,019,830 | A * | 4/1977 | Reid | F04D 3/02 416/177 |

(Continued)

FOREIGN PATENT DOCUMENTS

| | | |
|---|---|---|
| CN | 205277906 U | 6/2016 |
| CN | 110094357 B | 7/2021 |
| JP | 3949663 B2 | 10/2012 |

*Primary Examiner* — Peter J Bertheaud
(74) *Attorney, Agent, or Firm* — Bullock Law; Stephen Bullock

(57) ABSTRACT

Embodiments of the present invention are related to a centrifugal pump system including a cylinder with a cylinder bottom having a lower chamber, a cylinder body including a plurality of longitudinal channels, and a cylinder top with a plurality of spouts. The centrifugal pump system also has an annulus including a circular channel with an outlet. The centrifugal pump system is structured to transport fluid from below the cylinder bottom, through the cylinder lower chamber, through the plurality of longitudinal channels and the cylinder spouts before exiting the annulus outlet.

19 Claims, 19 Drawing Sheets

(56) References Cited

U.S. PATENT DOCUMENTS

| | | | | |
|---|---|---|---|---|
| 4,193,737 | A * | 3/1980 | Lemmon | F04D 7/02 |
| | | | | 415/206 |
| 4,523,900 | A * | 6/1985 | Frey | F04D 29/445 |
| | | | | 417/365 |
| 5,061,151 | A | 10/1991 | Steiger | |
| 7,341,424 | B2 | 3/2008 | Dial | |
| 9,101,256 | B2 | 8/2015 | Guo | |
| 10,087,907 | B2 * | 10/2018 | Fjalling | F03B 7/00 |
| 11,073,158 | B2 | 7/2021 | Hoehn | |
| 2012/0016178 | A1 | 1/2012 | Woodard | |
| 2013/0287558 | A1 | 10/2013 | Buse | |

* cited by examiner

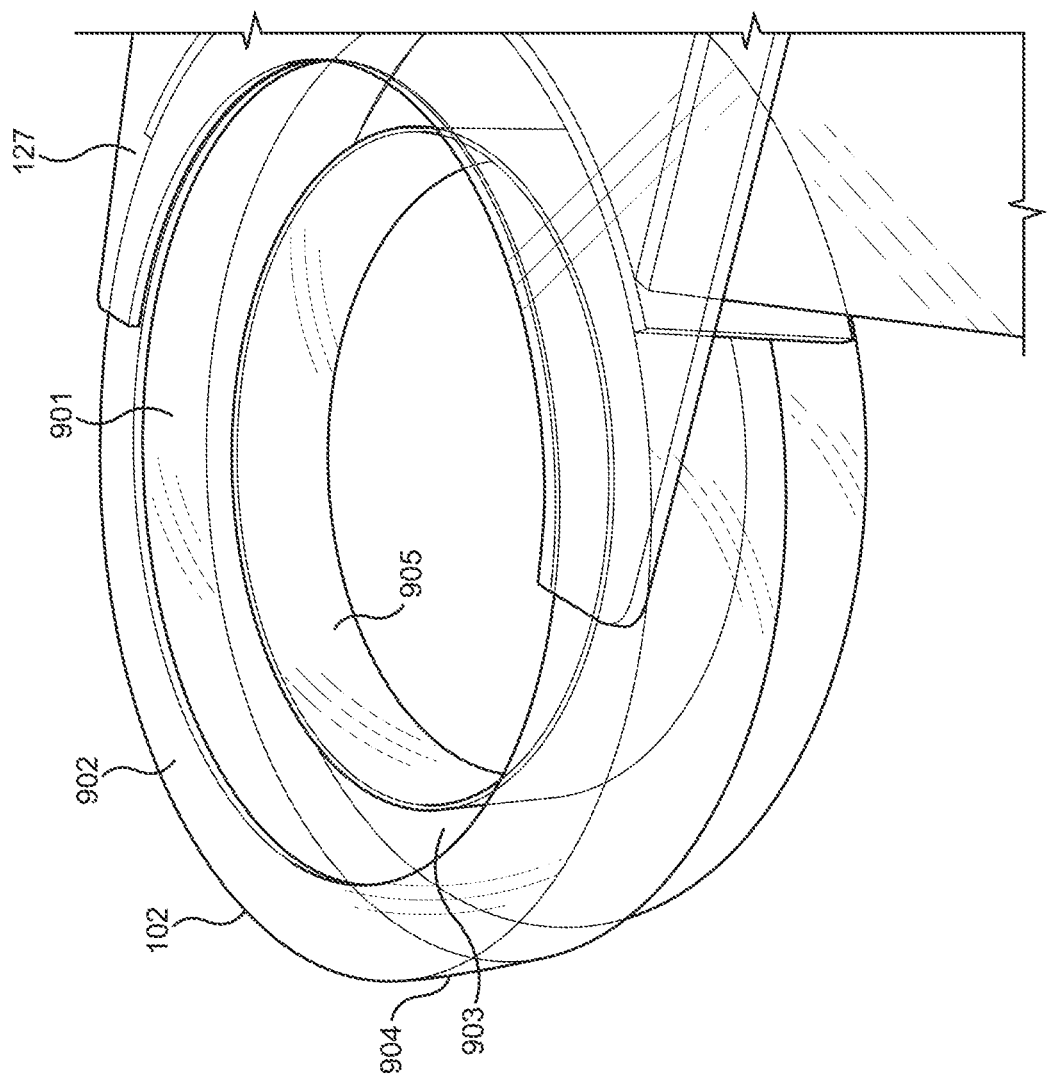

CENTRIFUGAL PUMP SYSTEM

FIELD OF THE INVENTION

The present invention relates to systems and methods for pumping water from a lower area to a higher area. In particular, the present invention relates to a centrifugal pump system and associated methods.

BACKGROUND

Traditional fluid pump systems utilize blades whereby the fluid is drawn into and through the system by the blades. However, these systems don't provide a safe and efficient transportation of material within the fluid, such as fish, without harming them. Furthermore, many of these systems are not equipped to transport fluid from a lower level to a higher level in a quick and easy way that minimizes spillage and maintains the integrity of the fluid and its cargo.

Therefore, there exists a need in the art for a fluid transportation system that is capable of carrying fluid and its content safely from a lower level to a higher level in a fast and efficient manner. There exists a need in the art for a centrifugal pump system and associated methods as described herein.

This background is provided to reveal information believed by the applicant to be of possible relevance to the present invention. No admission is made as to prior art and nothing within the background should be construed as prior art against the present invention.

SUMMARY OF THE INVENTION

Embodiments of the present invention are related to a centrifugal pump system including a cylinder with a cylinder bottom having a lower chamber, a cylinder body including a plurality of longitudinal channels, and a cylinder top with a plurality of spouts. The centrifugal pump system may have an annulus including a circular channel with an outlet. The centrifugal pump system may be structured to transport fluid from below the cylinder bottom, through the cylinder lower chamber, through the plurality of longitudinal channels and the cylinder spouts before exiting the annulus outlet.

In this embodiment, the lower chamber may be one of bowtie shaped, linear shaped, spiral shaped, and cross-shaped. It may also include a ramp connected to the annulus outlet structured to outlet fluid therethrough. The lower chamber may include openings at opposing ends that may be connected to the plurality of longitudinal channels. Furthermore, the cylinder may be structured to spin in a first direction and the spouts may be angled toward an opposing direction. The cylinder may include a medial axle rotatably connected to a rotational source structured to spin the cylinder and, in some embodiments, the rotational source may be one of a manual crank assembly, a motor, or a combination of the two.

Other embodiments may include the centrifugal pump system with a cylinder including a cylinder bottom with a central inlet, a medial stabilizer, and a bowtie chamber. It may have a cylinder body with a plurality of longitudinal channels and a central axle. It may also include a cylinder top with a top ridge having a plurality of angled spouts. The system may have an annulus with a circular channel, an annulus bottom, perimeter siding, an interior barrier, an upper lip, and an outlet. The cylinder may be structured to extend through an interior of the annulus and spin therein. The system may be structured to transport fluid from below the cylinder bottom, through the cylinder top and out the annulus outlet.

In this embodiment, the plurality of angled spouts may be biased in a clockwise orientation and the central inlet may surround the medial stabilizer. Additionally, the bowtie chamber may have end openings connected to the plurality of longitudinal channels structured to direct waterflow along the plurality of longitudinal channels. The cylinder may be structured to spin in a direction opposite the orientation of the plurality of angled spouts and the plurality of angled spouts may be connected to the plurality of longitudinal chambers at the cylinder top. The annulus may be structured to corral fluid within the circular channel and direct it through the outlet. The plurality of longitudinal channels may be positioned along the cylinder body periphery and enclosed within the cylinder. Furthermore, the cylinder top ridge may be structured to rest on top of the annulus interior barrier and the cylinder body my be structured to fit through a central void of the annulus.

Another embodiment of the invention may include a centrifugal pump system with a cylinder including a cylinder bottom with a central inlet, a medial stabilizer, and a bowtie chamber. It may have a cylinder body with a plurality of longitudinal channels and a central axle and a cylinder top including a top ridge with a plurality of angled spouts. It may also have an annulus with a circular channel, an annulus bottom, perimeter siding, an interior barrier, an upper lip, and an outlet. The system may include a rotational source whereby the rotational source may be one of a manual crank assembly, a motor, or a combination of the two structured to spin the cylinder. The cylinder may be structured to extend through an interior of the annulus and the bowtie chamber may include end openings connected to the plurality of longitudinal channels that may be structured to direct waterflow along the plurality of longitudinal channels. The plurality of angled spouts may be biased in a clockwise orientation and the system may be structured to transport fluid from below the cylinder bottom, through the cylinder top and out the annulus outlet.

In this embodiment, the bowtie chamber may further include openings at opposing ends. Furthermore, the plurality of angled spouts may be connected to the plurality of longitudinal chambers at the cylinder top and they may be structured to direct flow into the annulus.

BRIEF DESCRIPTION OF THE DRAWINGS

FIG. 9A is a segmented top perspective view of centrifugal pump system componentry according to the embodiment of the invention illustrated in FIG. 1.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1A:
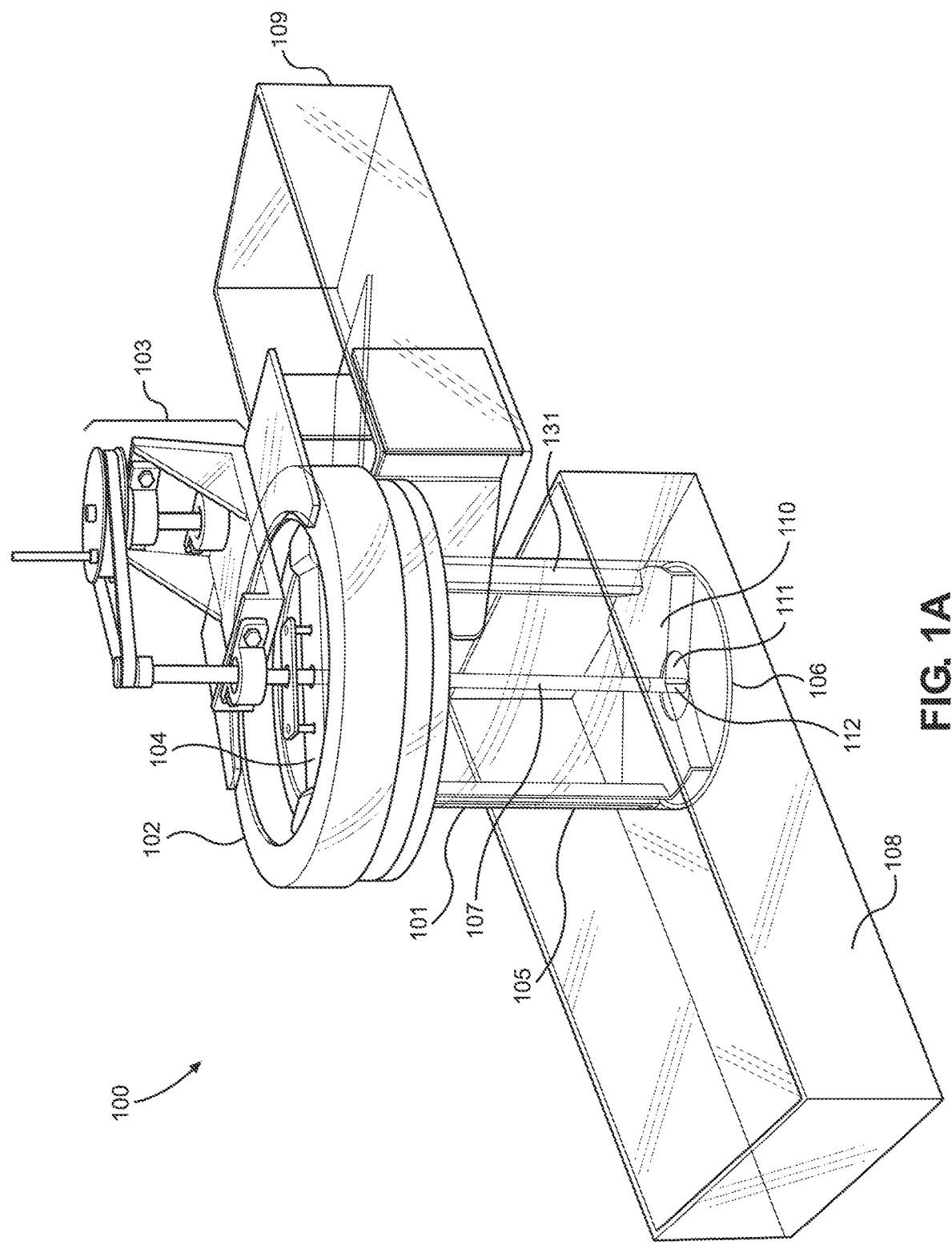
FIG. 1A is a front perspective view of a centrifugal pump system according to an embodiment of the invention.

Referring now to FIG. 1A, the centrifugal pump system 100, hereinafter the system 100, may include a cylinder 101, an annulus 102 and a rotational source 103. The cylinder 100 may include a cylinder top 104, a cylinder body 105, and a cylinder bottom 106. It may be rotated along a medial axle 107 extending centrally along its longitudinal length by the rotational source 103. The cylinder 101 may be stabilized by a medial stabilizer 112 extending through an inlet 111 within the cylinder bottom 106. In some embodiments, the medial stabilizer 112 may connect with the bottom of a lower pool 108.

The cylinder 101 may be structured to allow fluid to enter the inlet 111 from the lower pool 108, travel through a lower chamber 110 and be distributed to the cylinder body 105 periphery. The fluid may then travel along longitudinal channels 131 on the cylinder body 105 to the annulus 102 where it may subsequently be released into an upper pool 109. One skilled in the art will appreciate that the system 100 may be constructed from plastic, metal, cement, wood, and the like or a combination thereof.

Figure 1B:
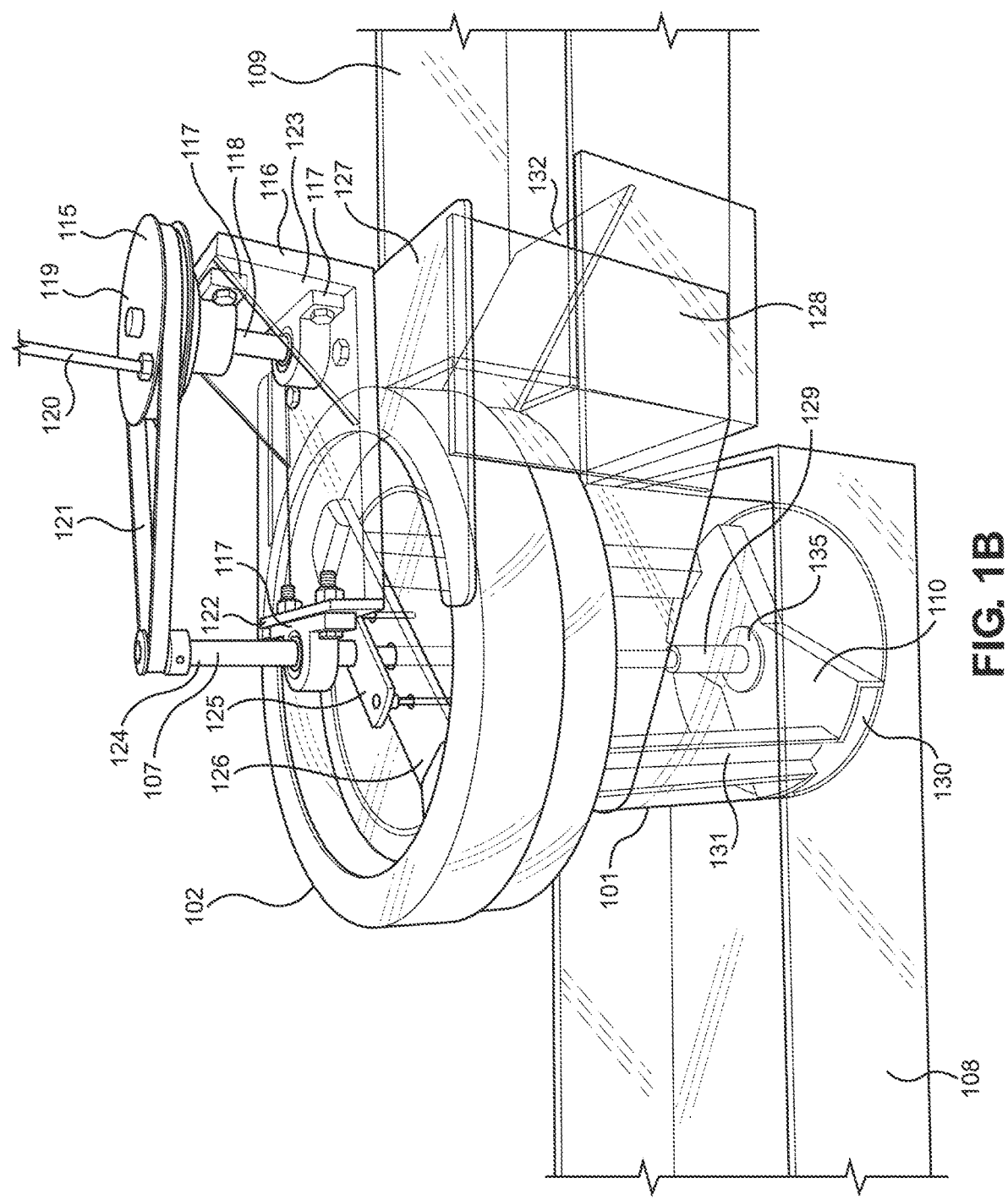
FIG. 1B is a top perspective view of a centrifugal pump system according to the embodiment of the invention illustrated in FIG. 1.

FIG. 1B illustrates componentry of the system 100 in more detail. In some embodiments, the rotational source 103 may be a crank assembly 115 used to generate rotation. Furthermore, one skilled in the art will appreciate that the rotational source 103 may be any number of means including a manual crank system 115, a motor, or a combination of the two. However, in the current embodiment, the crank assembly 115 may include a flywheel 119, a crank 120, and a drive belt 121 that connects to a rotatable upper shaft 124 of the medial axle 107. The rotatable upper shaft 124 may be connected to an axle cylinder mount 125 fastened to a cylinder diameter platform 126. The rotation of the upper shaft 124 may thereby transfer its rotation to the cylinder 101.

The crank assembly 115 may be attached to a crank assembly mount 116 including opposing end walls 122. A vertical spacer 118 may be attached to a first end wall 122 via crank assembly attachment brackets 117 and the flywheel 119 may be situated there above. However, one skilled in the art will appreciate that in some embodiments the cylinder 101 may be rotated at the cylinder bottom 106 whereby the rotational source 103 may be positioned proximate thereto. Nevertheless, in this embodiment, a second end wall 122 may include an axle attachment bracket 117 structured to stabilize the rotatable upper shaft 124. Furthermore, the rotatable upper shaft 124 and the vertical spacer 118 may be sized and dimensioned to position the drive belt 121 horizontally at an upper portion of the system 100.

The entire crank assembly mount 116 may be positioned atop a crank assembly platform 127. The crank assembly platform 127 may be u-shaped at a first end so as to congruently mimic the circular shape of a perimeter of the annulus 102. A second end of the crank assembly platform 127 may be square or rectangular shaped and may sit atop a pair of platform side supports 128. In combination, the platform side supports 128, the crank assembly platform 127, and the crank assembly mount 116 may be structured to allow the crank assembly 115 to securely rotate the cylinder from an upper portion of the system 100 maintaining a level posture for the drive belt 121.

Also shown by the figure is a lower portion of the cylinder 101. In some embodiments, the medial axle 107 may be removable from a central portion of the cylinder 101. In this case, the medial axle 107 may removably engage an axle connector 129 proximate a top surface of the lower chamber 110. This modular embodiment may allow for replacement of the medial axle 107 should that be necessary. Furthermore, in some embodiments there may be a washer 135 used either in conjunction with the medial axle 107 or if used, the axle connector 129, on the top surface of the lower chamber 110.

Further illustrated by this figure is that the lower chamber 110 may include end openings 130 situated at ends of the lower chamber 110 and that an upper portion of the system 100 may include an outlet ramp 132 to facilitate the exit of fluid from the annulus 102.

Figure 2:
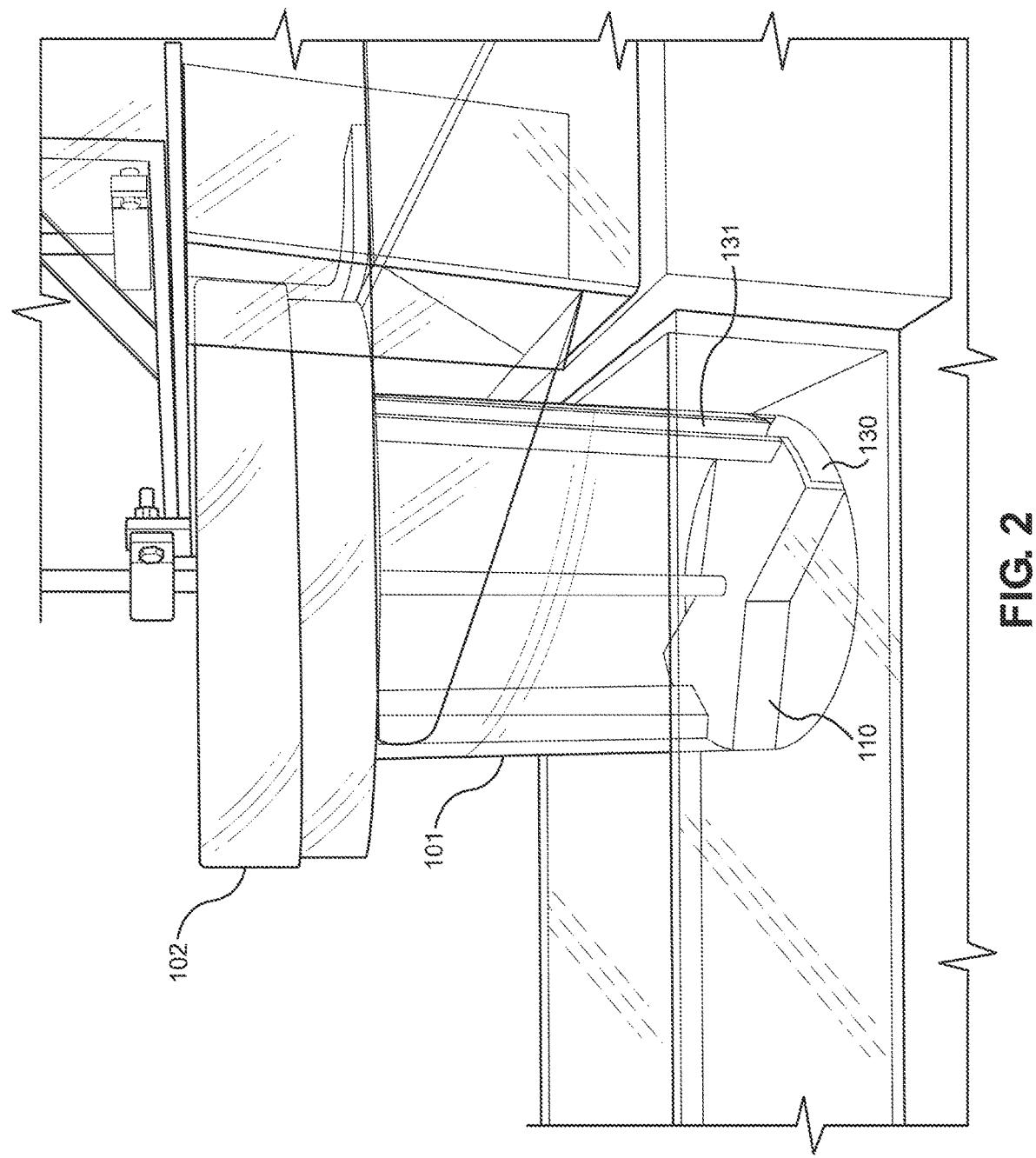
FIG. 2 is a segmented front perspective view of centrifugal pump system componentry according to the embodiment of the invention illustrated in FIG. 1.

FIG. 2 emphasizes the end openings 130 of the lower chamber 110 and the longitudinal channels 131 found within the cylinder 101. As will be explained more fully hereafter, both the end openings 130 and the longitudinal channels 131 are enclosed within the cylinder 101 by its outer perimeter wall. This facilitates the directing of fluid flow therein without fluid escaping the cylinder 101.

Figure 3:
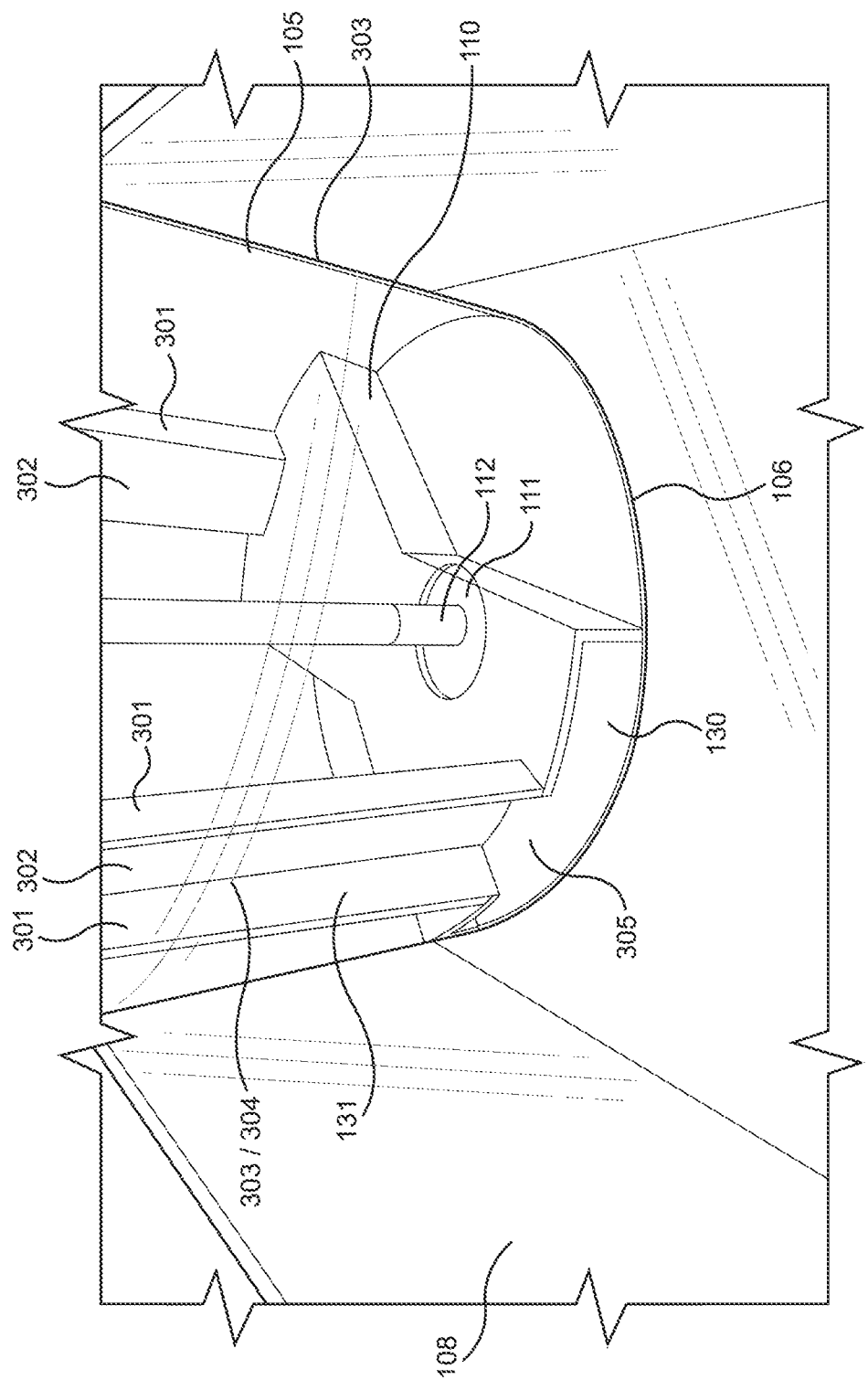
FIG. 3 is a segmented front perspective view of centrifugal pump system componentry according to the embodiment of the invention illustrated in FIG. 1.

FIG. 3 shows more detail of the lower chamber 110 highlighting the end openings 130 and their connection point 305 with the longitudinal channels 131. As shown, in some embodiments the lower chamber 110 may be structured as a bowtie chamber whereby each opposing end has an end opening 130. Furthermore, the longitudinal channels 131 may include a channel side wall 301, a channel back wall 302 and a channel front wall 303, which may also be the cylinder outer wall 304. Therefore, the cylinder outer wall 303 of the cylinder body 105 may enclose the end openings 130 and the longitudinal channels 131 to create a directed pathway for fluid to flow therethrough. Also shown is the medial stabilizer 112 protruding through the inlet 111 and connecting with the bottom of the lower pool 108.

Figure 4:
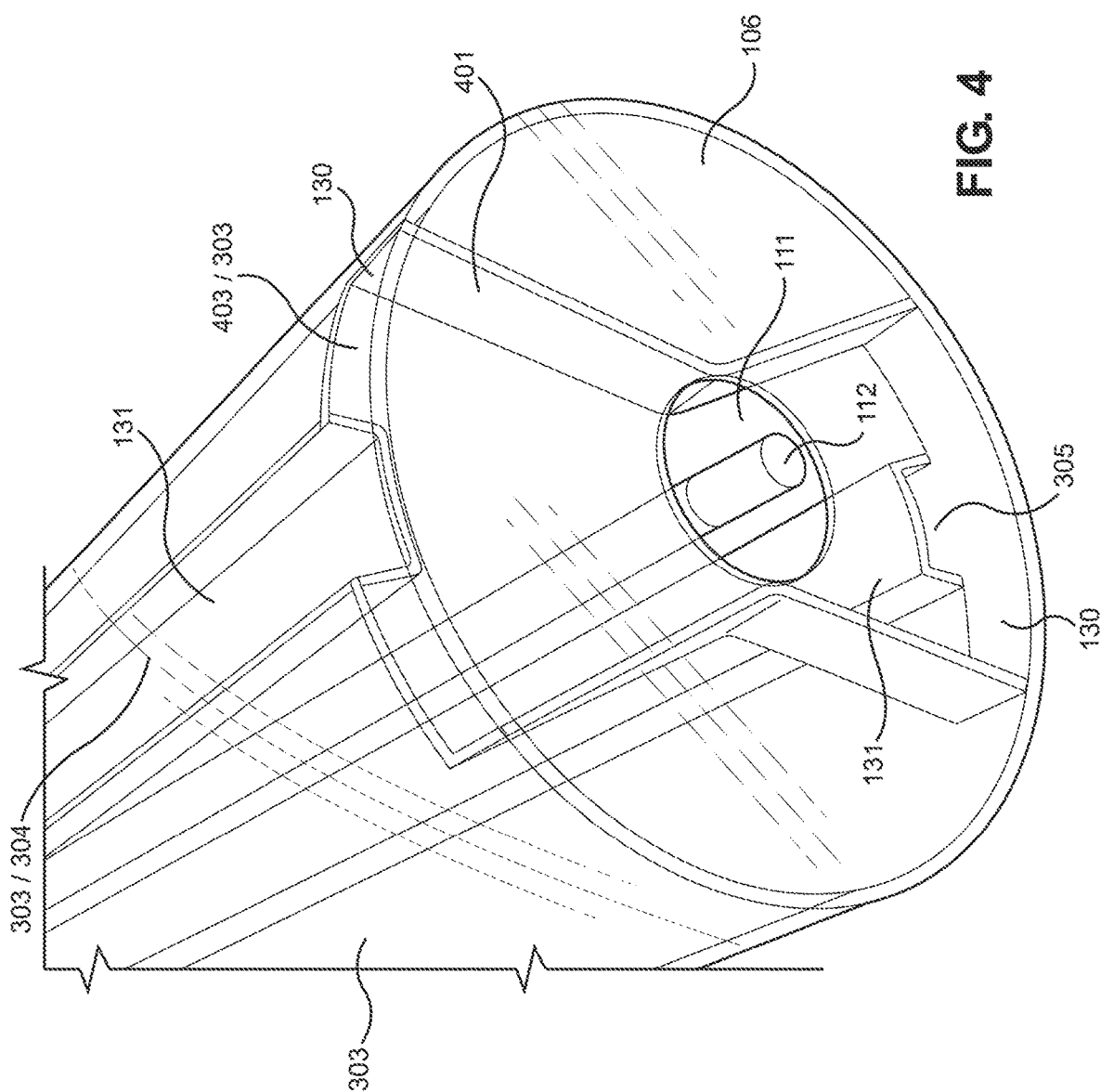
FIG. 4 is a bottom perspective view of centrifugal pump system componentry according to the embodiment of the invention illustrated in FIG. 1.

FIG. 4 illustrates a perspective bottom view of the cylinder 101 showing how the medial stabilizer 112 protrudes the inlet 111 at the cylinder bottom 106. Furthermore, the bowtie lower chamber 110 may include directional chamber walls 401 that angle wider toward the perimeter of the cylinder 101 forming a wider end opening 130 than the inlet 111. Here the end opening 130 is bifurcated by the longitudinal channel 131 at its connection point 305. Furthermore, the end opening 131 may extend from the cylinder bottom 106 to a distal point on the cylinder body 105 allowing room within the lower chamber 110 for water to flow therethrough. As previously stated, the end openings 131 may be enclosed by the cylinder outer wall 303. Likewise, the longitudinal channels 131 may be recessed toward an inner portion of the cylinder 101 to allow for fluid to flow upward therein while enclosed by the cylinder outer wall 303. As shown, the longitudinal channel 131 is rectangular running the length of the cylinder 101. However, other embodiments may include longitudinal channels 131 that may be curved or spiraled.

Figure 5:
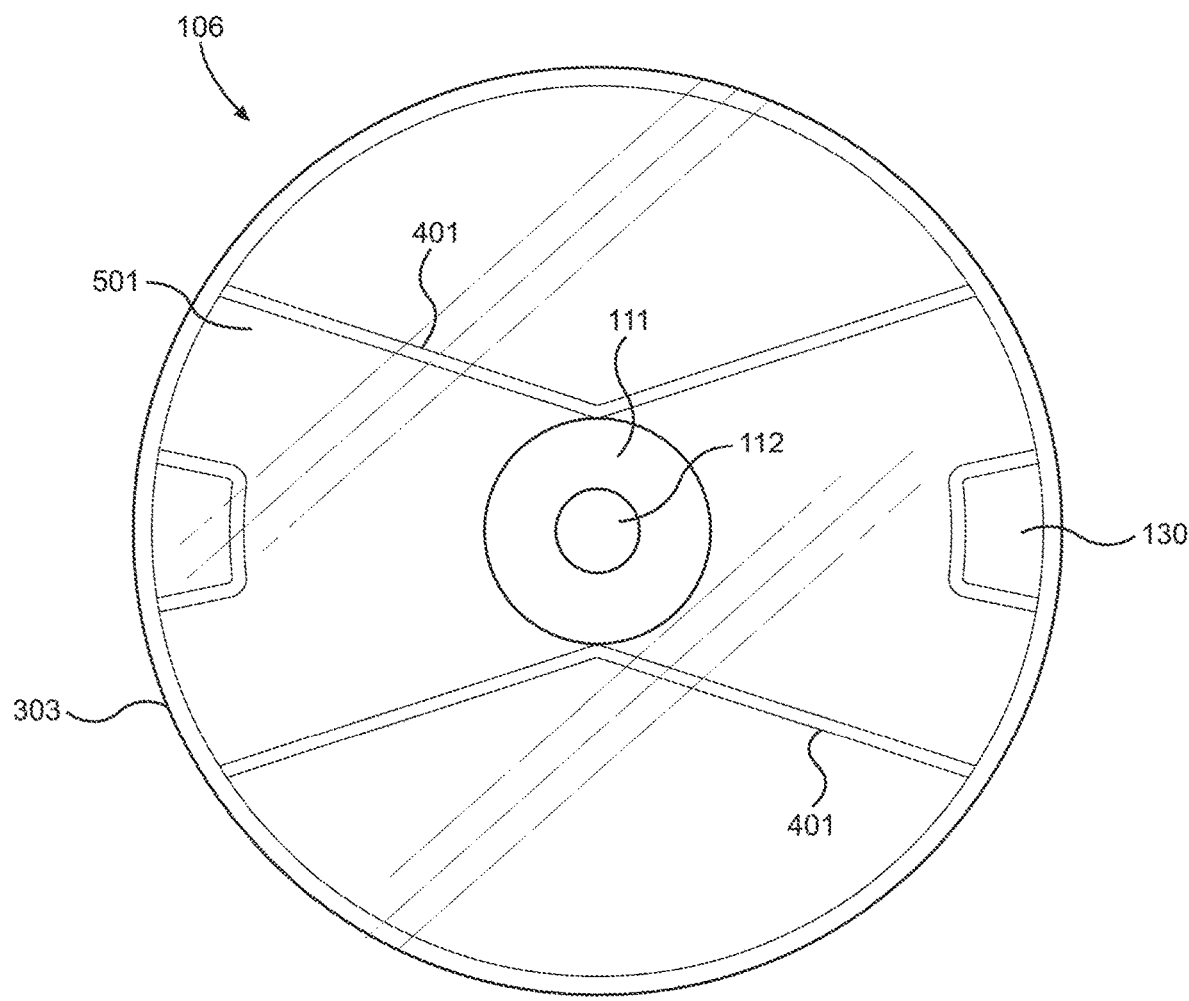
FIG. 5 is a bottom view of centrifugal pump system componentry according to the embodiment of the invention illustrated in FIG. 1.

FIG. 5 is a planar bottom view of the cylinder 101 illustrating that the lower chamber 110 may be a bowtie chamber 501 formed by the angled directional chamber walls 401. This figure also illustrates the relationship of the end openings 130 enclosed by the cylinder outer wall 303 as well as the positioning of the medial stabilizer 112 protruding through the inlet 111.

Figure 6:
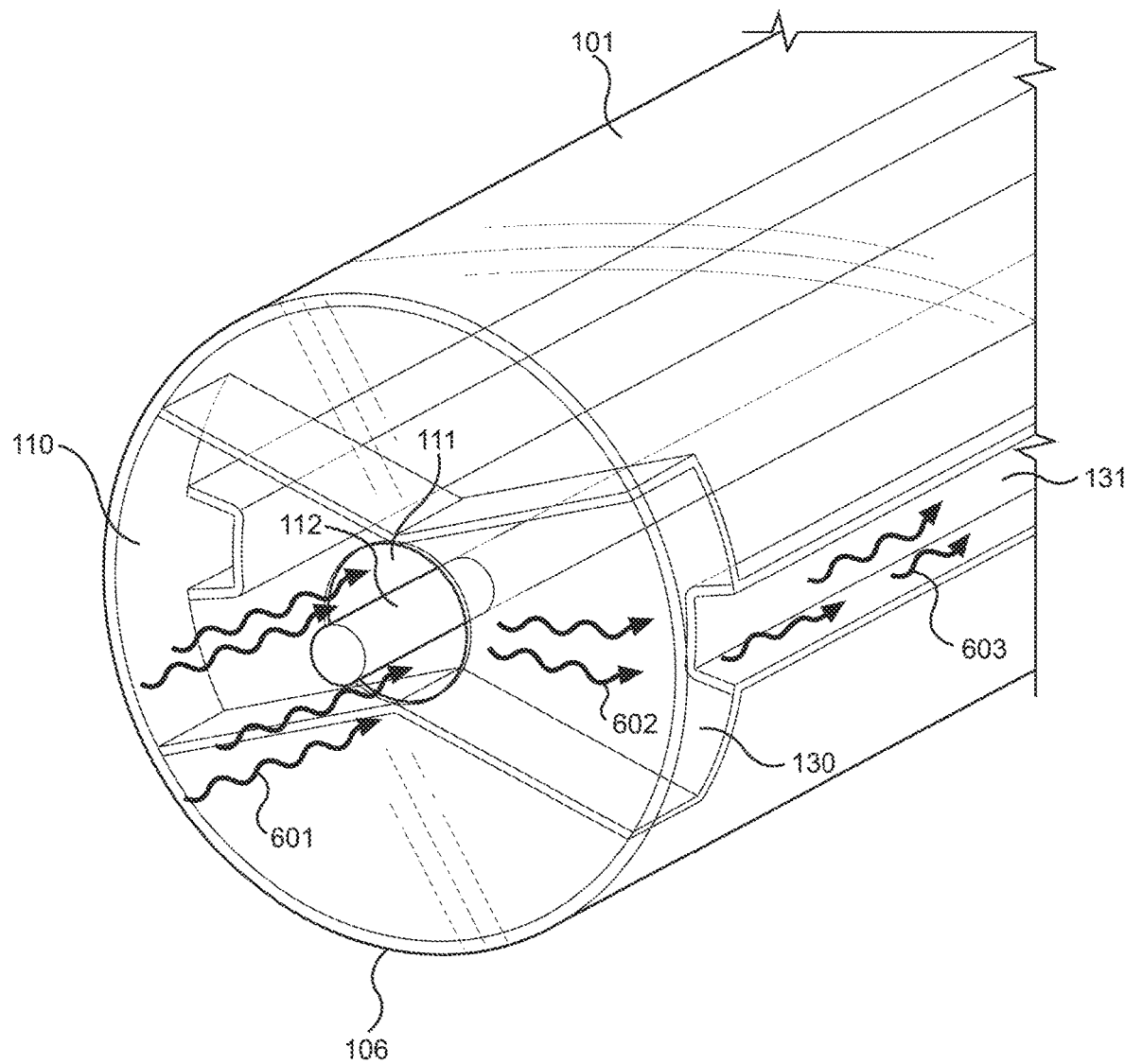
FIG. 6 is a bottom perspective view of centrifugal pump system componentry according to the embodiment of the invention illustrated in FIG. 1.

FIG. 6 highlights the fluid flow pathway as it enters the cylinder 101. As shown, when the cylinder 101 spins, centrifugal force may cause fluid inflow 601 to enter the inlet 111 positioned around the medial stabilizer 112 at the cylinder bottom 106. The centrifugal force then causes for directed chamber flow 602 to be distributed toward and out the end openings 130. Furthermore, the centrifugal force causes longitudinal flow 603 along the longitudinal channels 131 along the periphery of the cylinder 101.

Figure 7:
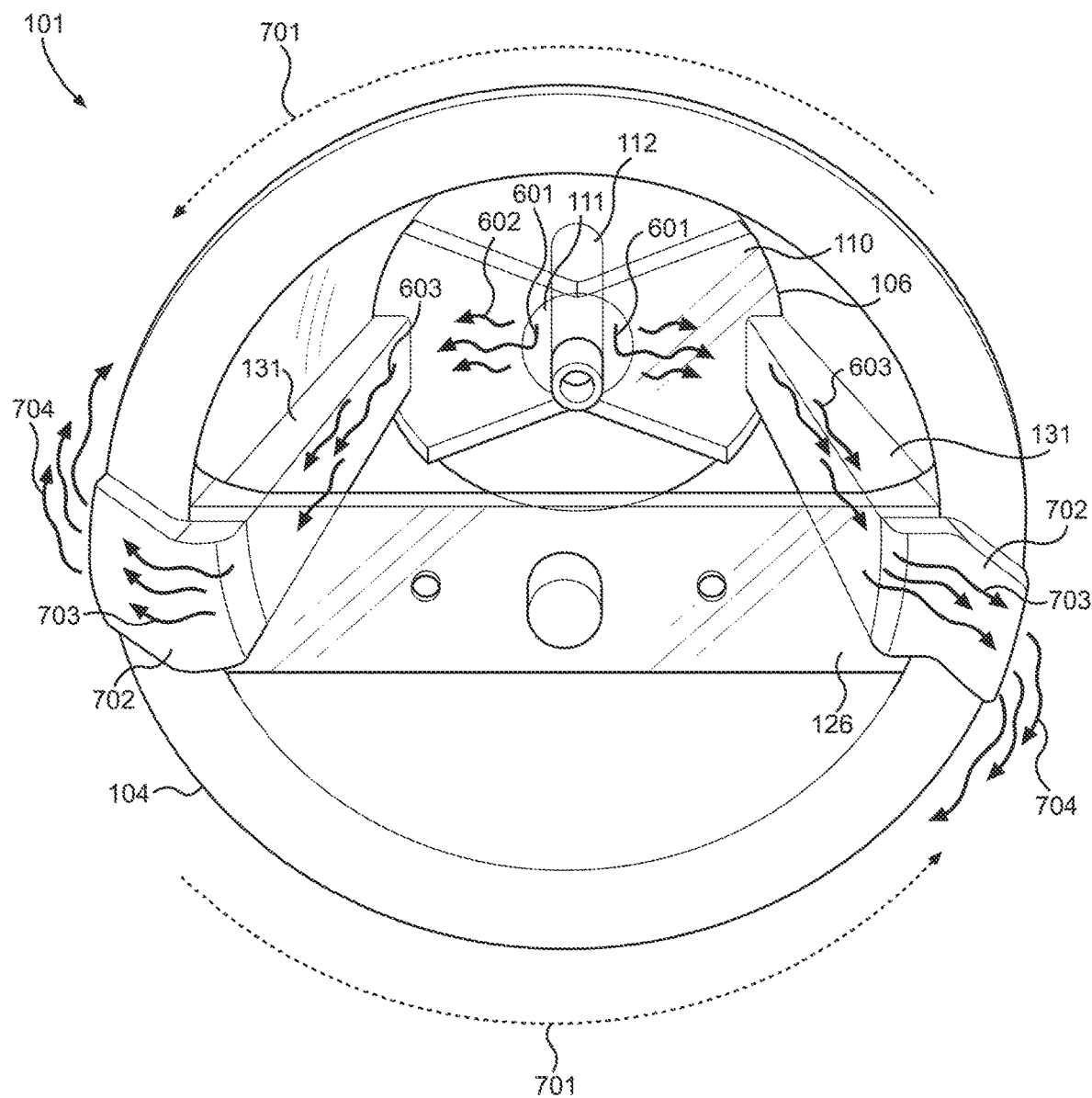
FIG. 7 is a top perspective view of centrifugal pump system componentry according to the embodiment of the invention illustrated in FIG. 1.

FIG. 7 is a top-down view of the cylinder 101 as it is being rotated. In this embodiment, the cylinder rotation 701 is in a counter clockwise direction. As a result, fluid inflow 601 is being drawn in through the inlet 111 at the cylinder bottom 106 and directed chamber flow 602 is being distributed toward each longitudinal channel 131. In this embodiment, longitudinal flow 131 is then drawn upwards through the longitudinal channels 131 and through spouts 702 positioned atop the cylinder diameter platform 126 at the cylinder top 104. In this embodiment, the spouts 702 are angled causing angled flow 703 to create counter rotational directed flow 704 when it exits. In essence, the angled flow 703 is left behind the cylinder rotation 701, which assist with settling the fluid within the annulus 102 preventing it from splashing out.

Figure 8:
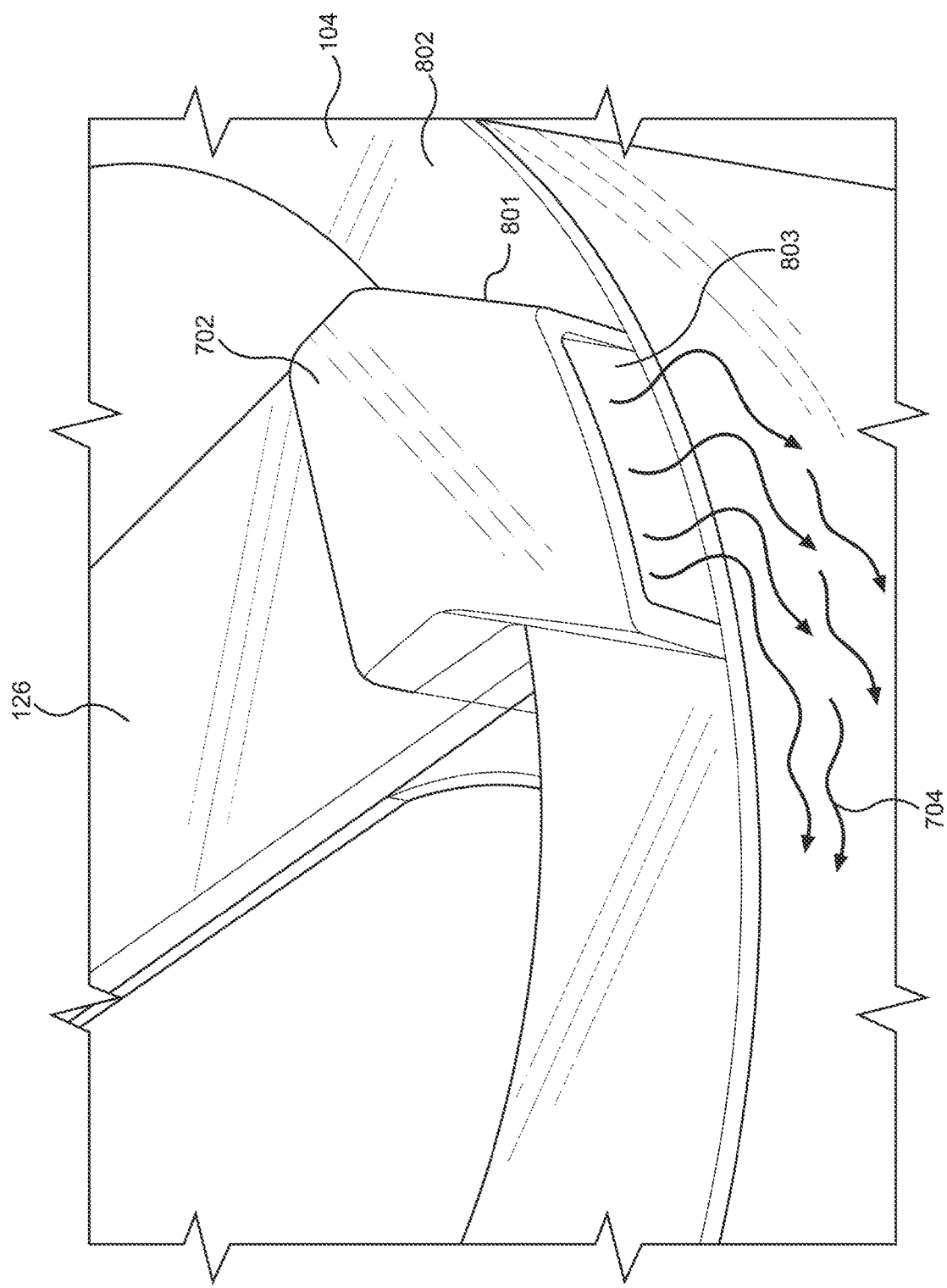
FIG. 8 is a segmented perspective view of centrifugal pump system componentry according to the embodiment of the invention illustrated in FIG. 1.

FIG. 8 illustrates a closer look at an angled spout 702 as it sits atop the cylinder diameter platform 126 and a cylinder top ridge 802 at the cylinder top 104. As shown, the counter rotational directed flow 704 is exiting the spout opening 803 at the perimeter of the cylinder top ridge 802 allowing for the fluid to settle and be distributed in an organized manner within the annulus 102.

Figure 9B:
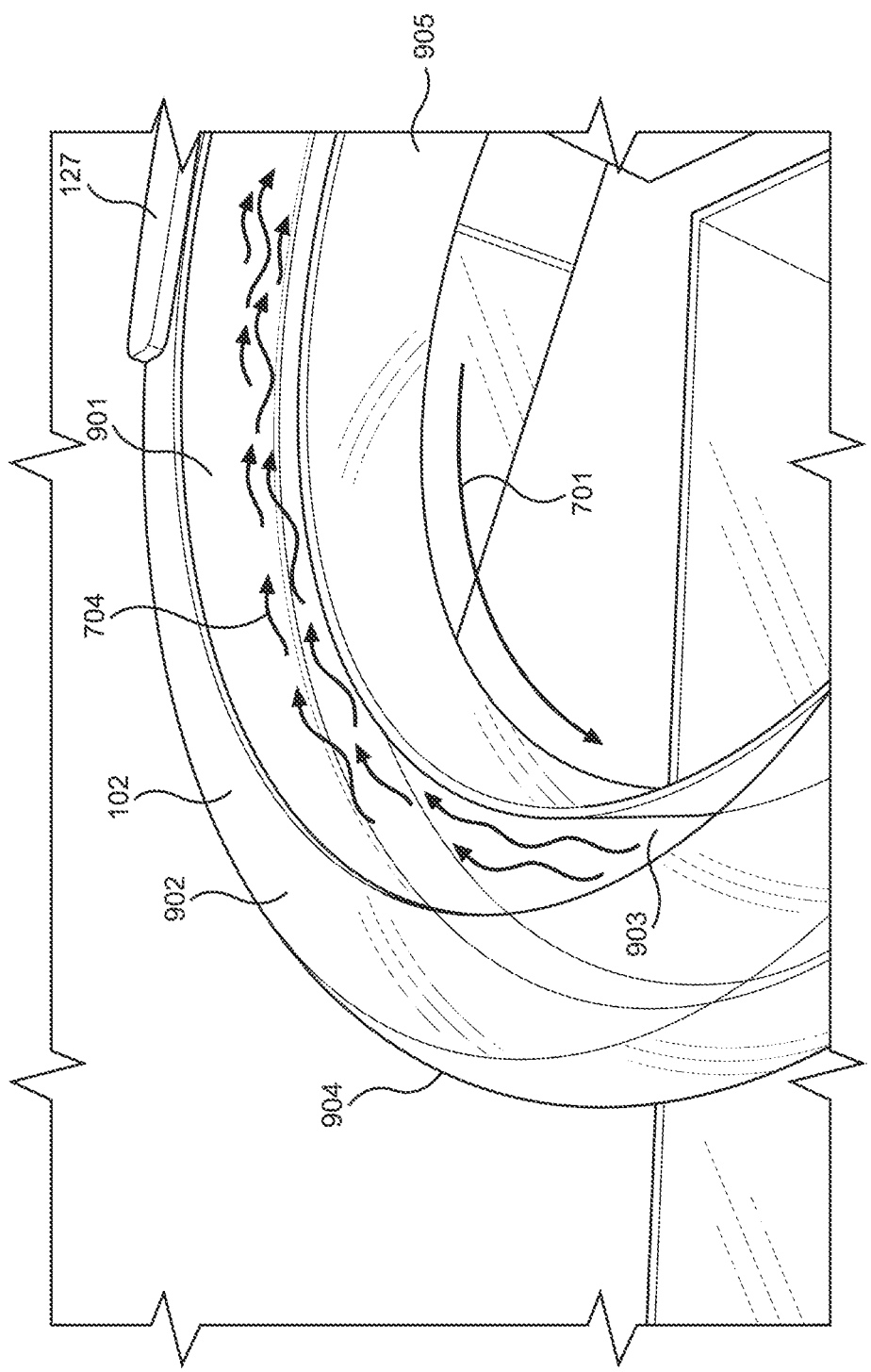
FIG. 9B is a top perspective view of centrifugal pump system componentry according to the embodiment of the invention illustrated in FIG. 1.

FIGS. 9A and 9B highlight the structure of the annulus 102 and illustrate how the counter rotational directed flow 704 may travel therein. As shown, the annulus 102 may include a circular channel 901 formed by an upper lip 902, an annulus bottom 903, a perimeter siding 904, and an interior barrier 905. In some embodiments, the annulus 102 may be fixedly attached to the crank assembly platform 127 and may extend downward therefrom.

As mentioned, the counter rotational directed flow 704 may oppose the cylinder rotation direction 701. In this embodiment, the cylinder rotation 701 is counterclockwise and the counter rotational directed flow 704 is clockwise. In this embodiment, the counter rotational directed flow 704 is being directed toward a portion of the annulus 102 proximate the crank assembly platform 127, where it may exit the annulus 102.

Figure 10:
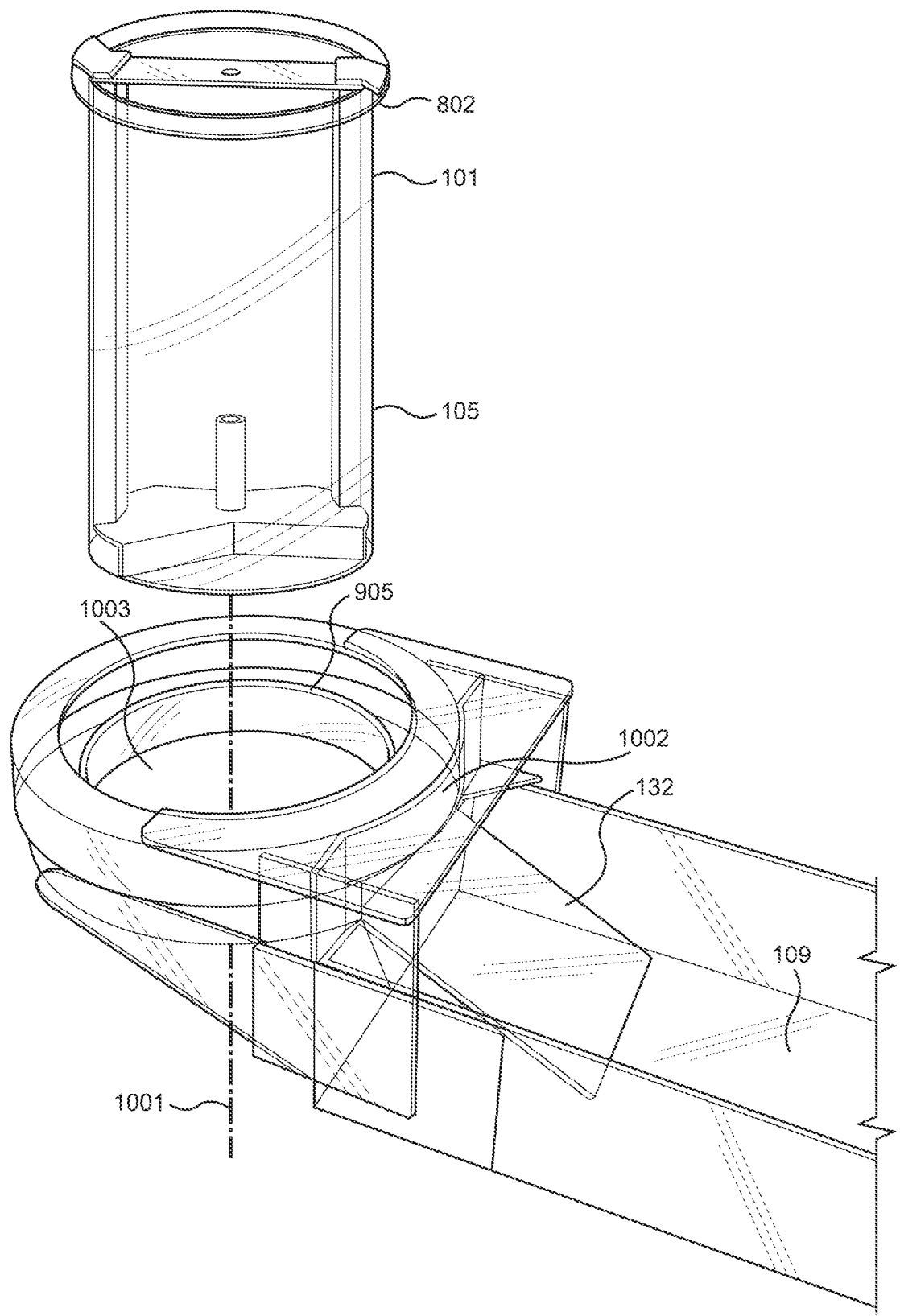
FIG. 10 is an exploded view of centrifugal pump system componentry according to the embodiment of the invention illustrated in FIG. 1.

FIG. 10 illustrates how the cylinder 101 and the annulus 102 may fit together and highlights some other structural features of the system 100. As shown, the cylinder 101 may fit through 1001 a central void 1003 within the annulus 102 and extend downward from the annulus 102. The top ridge 802 of the cylinder 101 may extend outward from a perimeter of the cylinder 101 making the top ridge 802 circumference larger than the circumference of the interior barrier 905. Therefore, the top ridge 802 may serve as a platform for the cylinder 101 to sit atop the interior barrier 905.

Also shown is an outlet 1002 within the annulus 102 whereby the counter rotational directed flow 704 may exit. The fluid may then descend an outlet ramp 132 and settle within the upper pool 109.

Figure 11:
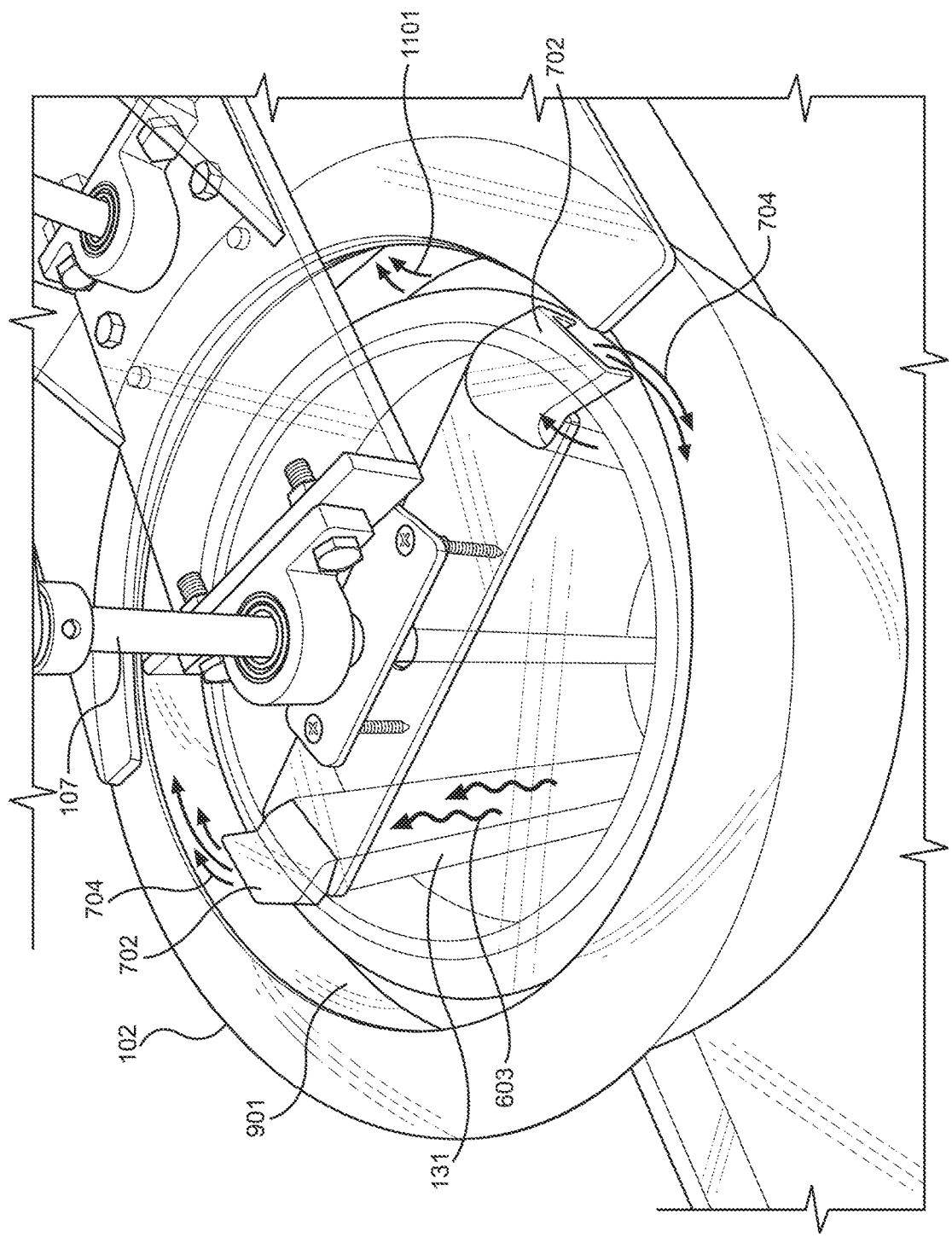
FIG. 11 is a top perspective view of centrifugal pump system componentry according to the embodiment of the invention illustrated in FIG. 1.
Figure 12:
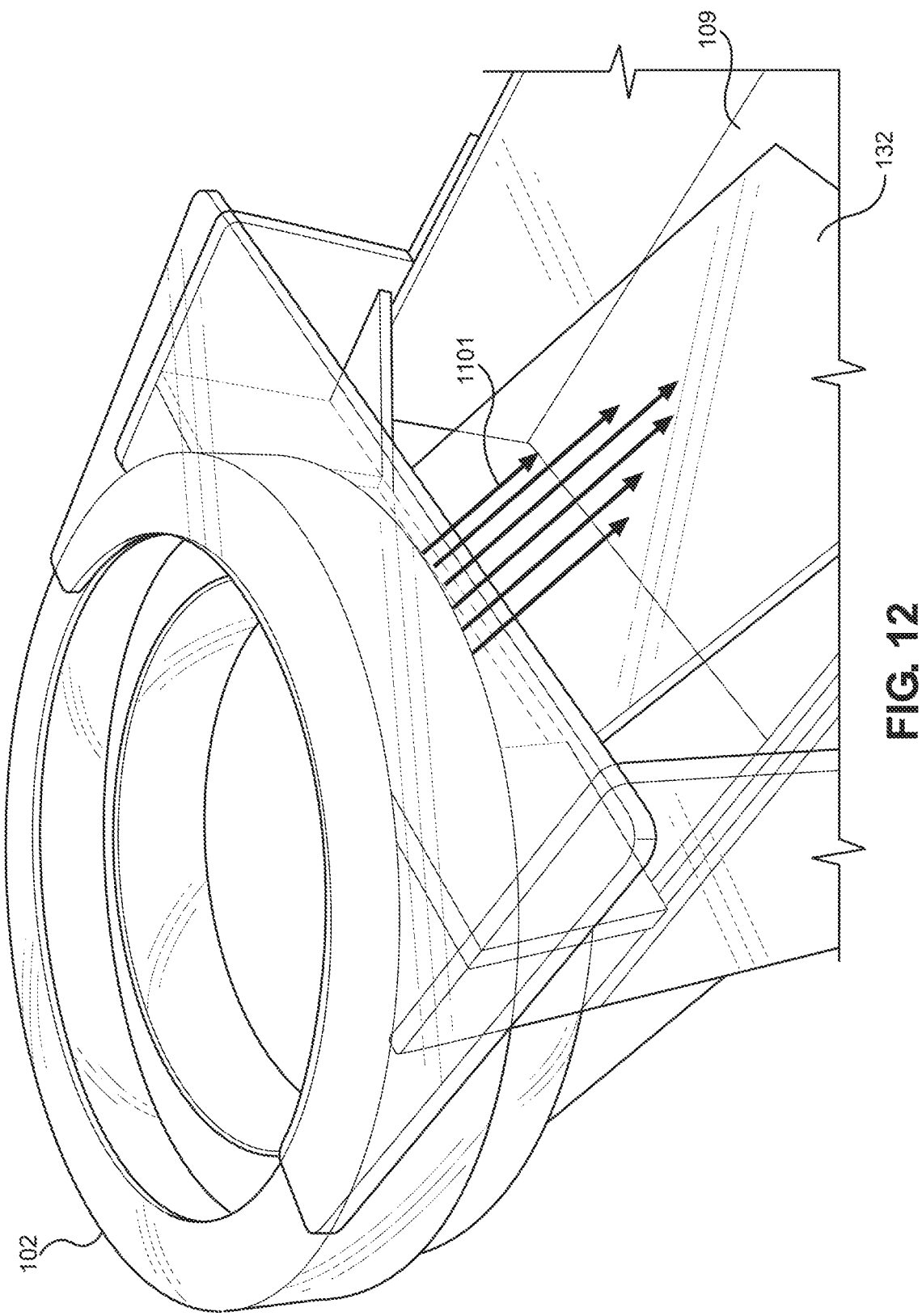
FIG. 12 is a top perspective view of centrifugal pump system componentry according to the embodiment of the invention illustrated in FIG. 1.
Figure 13:
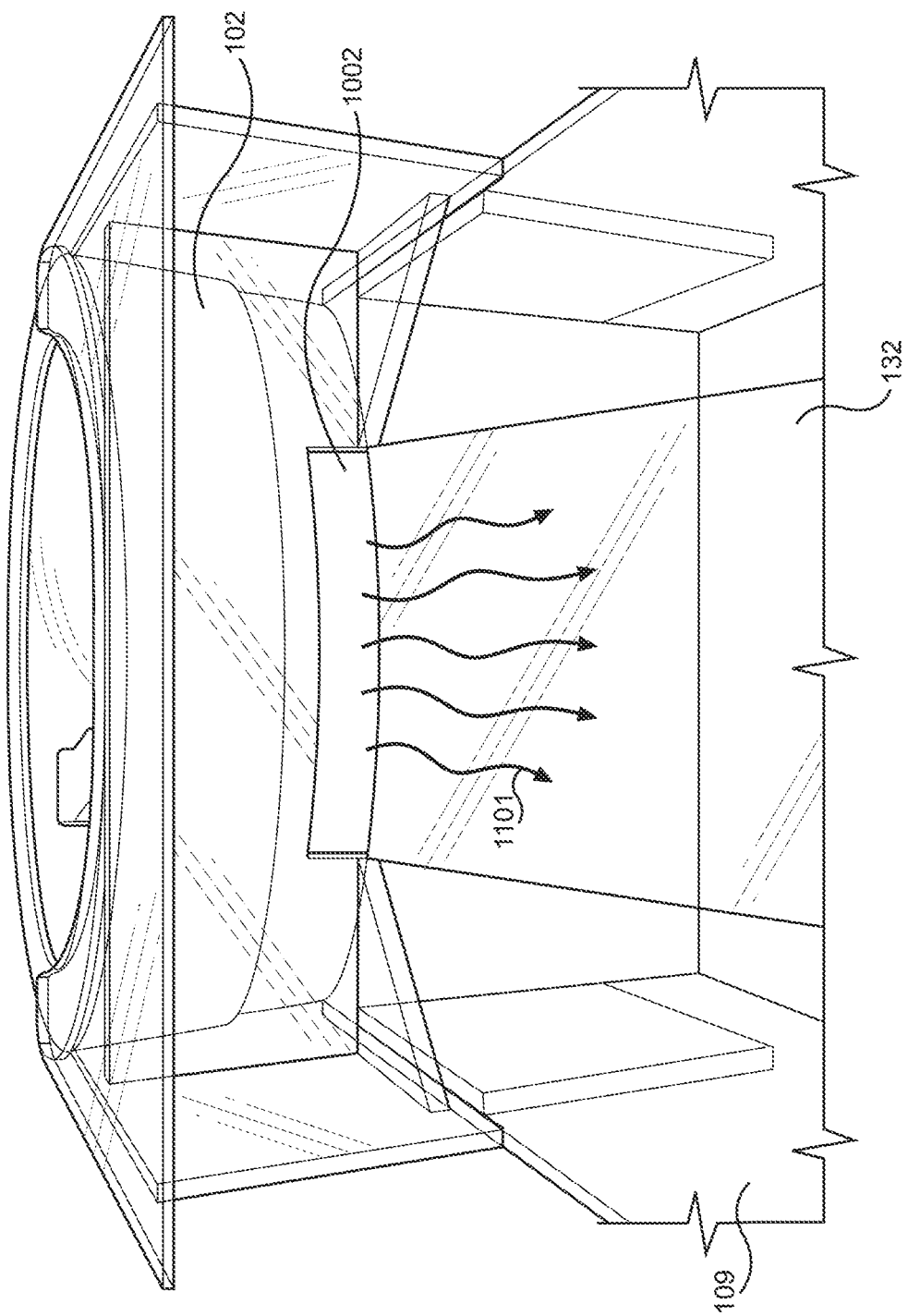
FIG. 13 is a side perspective view of centrifugal pump system componentry according to the embodiment of the invention illustrated in FIG. 1.

FIGS. 11, 12, and 13 highlight the pathway of fluid once it has reached an upper portion of the system 100. As shown in FIG. 11, when the medial axle 107 is spinning, longitudinal fluid flow 603 may flow upward through the longitudinal channels 131 out the spouts 702 and become counter directional fluid flow 704 within the circular channel 901 of the annulus 102. It may then be directed out the outlet 1002 and become exiting fluid 1101 descending the outlet ramp 132 into the upper pool 109.

Figure 14:
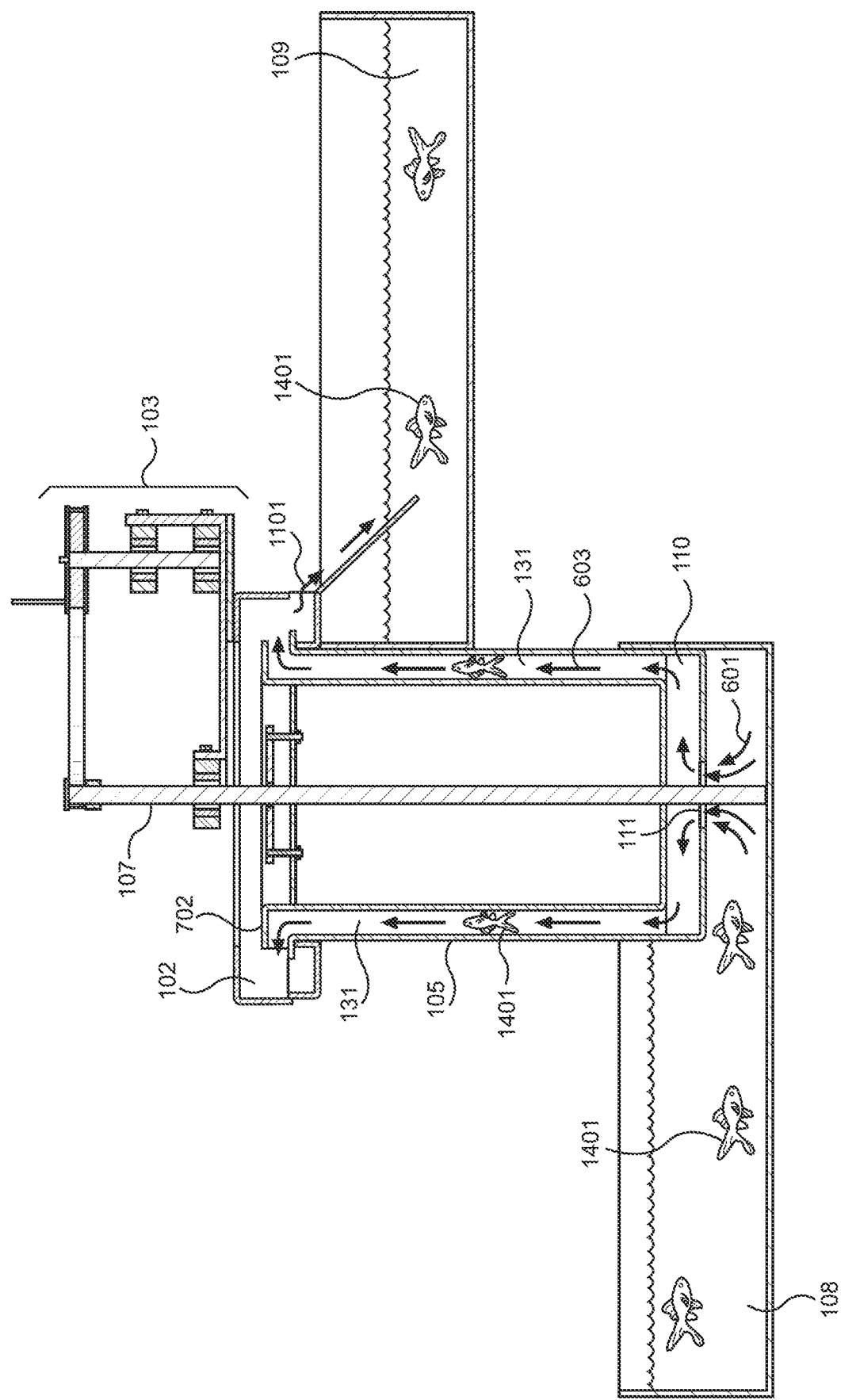
FIG. 14 is a dissected side environmental view of the centrifugal pump system according to the embodiment of the invention illustrated in FIG. 1.

FIG. 14 is an environmental side view of the system 100 illustrating one of its uses transporting fish 1401. Because the system 100 does not operate with a blade or propeller, it may transport items safely, including fish 1401, between the lower pool 108 and upper pool 109 without damaging them. As shown, a fish 1401 may be drawn into the inlet 111 along with the fluid inflow 601 by the centrifugal force created by the rotational source 103 spinning the medial axle 107. The fish 1401 may be directed within the lower chamber 110 toward the longitudinal channels 131 and out its end openings 130. There they may travel longitudinally along the longitudinal channels 131 and exit the spouts 702. They then flow with the counter directional fluid flow 701 within the annulus 102, through the outlet 1002 and down the outlet ramp 132 with the exiting fluid 1101 into the upper pool 109. Therefore, fish 1401 along with other delicate material may be quickly, safely and efficiently transported from a lower pool 108 to an upper pool 109 without causing them harm.

Figure 15:
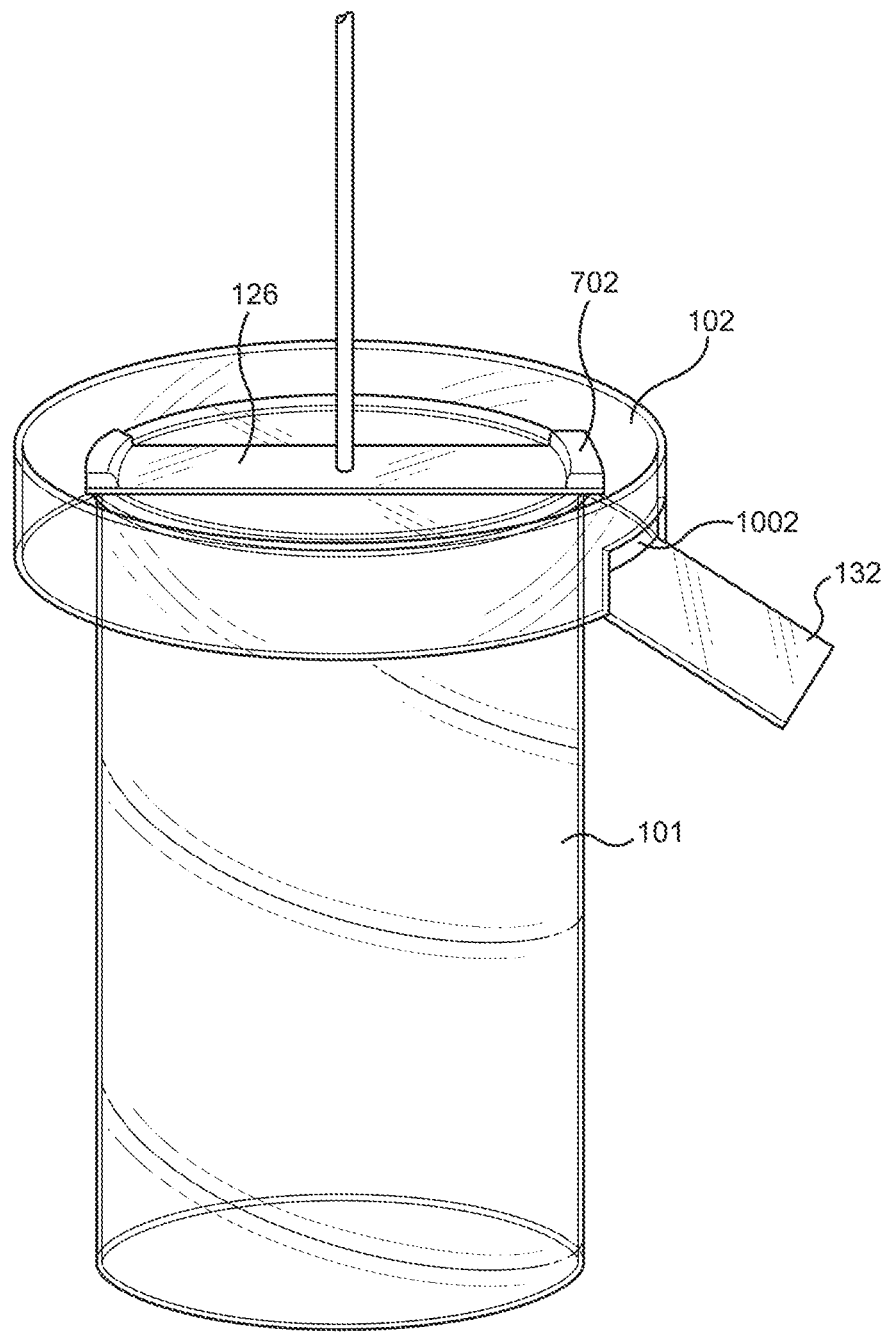
FIG. 15 is a front perspective view of centrifugal pump system componentry according to the embodiment of the invention illustrated in FIG. 1.

FIG. 15 shows a side perspective view of how the cylinder 101 may fit within the annulus 102. This figure provides an unobstructed view of the outlet 1002 positioned on the annulus 102 and outlet ramp 132 as it may connect to a portion of the annulus 102. It also emphasizes how the cylinder 101 may be positioned with respect to the annulus 102 when connected and working together.

Figure 16:
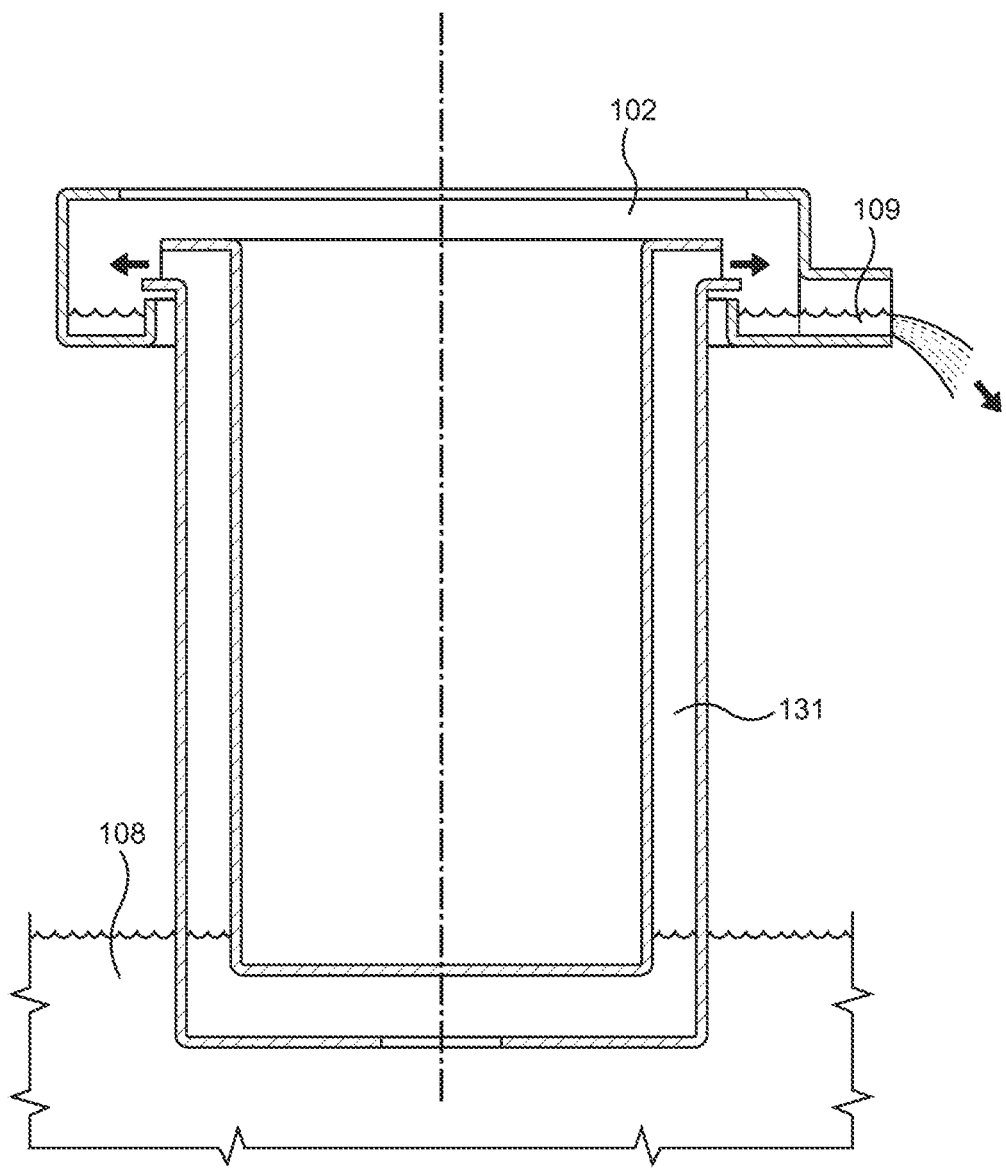
FIG. 16 is an environmental dissected side view of the centrifugal pump system componentry according to the embodiment of the invention illustrated in FIG. 1.

FIG. 16 is an environmental dissected side view of the cylinder 101 and annulus 102 working together. As shown, the fluid below the cylinder may be drawn up through the longitudinal chambers and exit the outlet 1002 connected to the annulus 102.

Figure 17C:
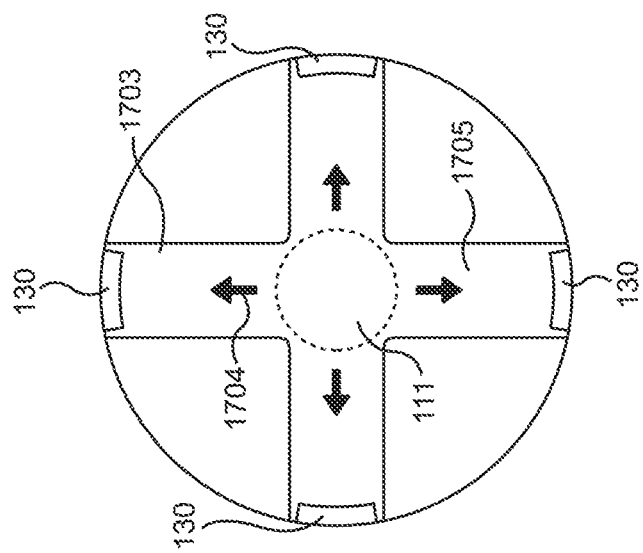
FIG. 17C is a bottom view of centrifugal pump system componentry according another embodiment of the invention.
Figure 17B:
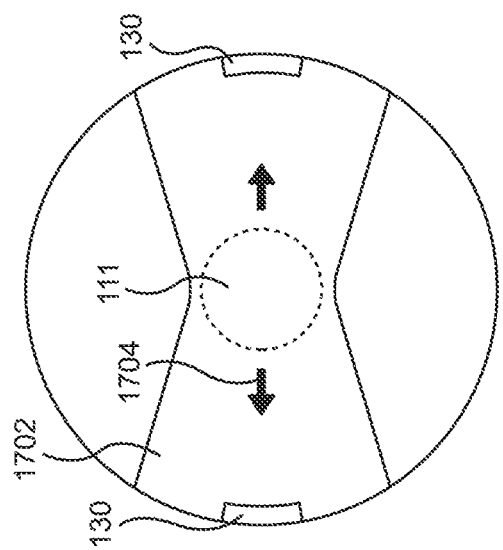
FIG. 17B is a bottom view of centrifugal pump system componentry according to the embodiment of the invention illustrated in FIG. 1.
Figure 17A:
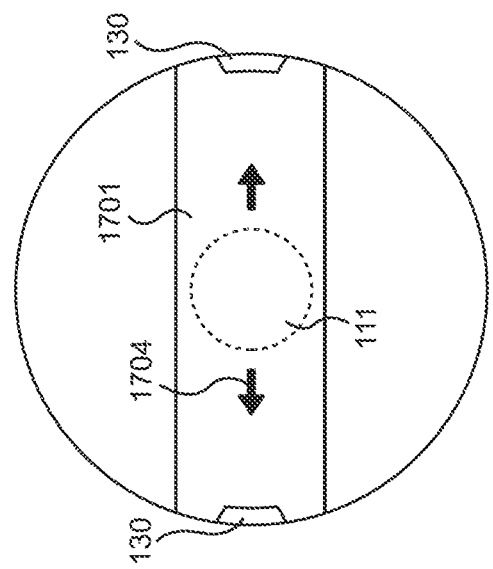
FIG. 17A is a bottom view of centrifugal pump system componentry according another embodiment of the invention.

FIGS. 17A, 17B, and 17C illustrate different embodiments of the cylinder bottom 106. FIG. 17A shows a linear lower chamber 1701 whereby fluid 1704 enters the inlet 111 and is distributed toward the end openings 130 in a straight pathway. FIG. 17B illustrates the bowtie embodiment described hereinabove. FIG. 17C illustrates a cross-formation chamber 1703 whereby fluid 1704 enters the inlet 111 and is distributed to a plurality of end openings 131 at the edge of perpendicular lower chamber channels 1705.

That which is claimed is:

1. A centrifugal pump system comprising:
   a cylinder comprising
      a cylinder bottom including a lower chamber;
      a cylinder body including a plurality of longitudinal channels; and
      a cylinder top including a plurality of spouts;
   an annulus comprising
      a circular channel, and
      an outlet;
   wherein the lower chamber is configured to rotate and is one of bowtie-shaped, linear-shaped, spiral-shaped, and cross-shaped; and
   wherein the centrifugal pump system is configured to transport fluid from below the cylinder bottom, through the cylinder lower chamber, through the plurality of longitudinal channels and the cylinder spouts before exiting the annulus outlet.

2. The centrifugal pump system of claim 1 further including a ramp connected to the annulus outlet configured to outlet fluid therethrough.

3. The centrifugal pump system of claim 1 wherein the lower chamber is a bowtie-shaped chamber with openings at opposing ends.

4. The centrifugal pump system of claim 3 wherein the openings are connected to the plurality of longitudinal channels.

5. The centrifugal pump system of claim 1 wherein the cylinder is configured to spin in a first direction and the spouts are angled toward an opposing direction.

6. The centrifugal pump system of claim 1 wherein the cylinder comprises a medial axle rotatably connected to a rotational source configured to spin the cylinder.

7. The centrifugal pump system of claim 6 wherein the rotational source is one of a manual crank assembly, a motor, or a combination of the two.

8. A centrifugal pump system comprising:
   a cylinder comprising
      a cylinder bottom including a central inlet, a medial stabilizer, and a bowtie-shaped chamber;
      a cylinder body including a plurality of longitudinal channels and a central axle; and
      a cylinder top including a top ridge with a plurality of angled spouts;
   an annulus comprising
      a circular channel,
      an annulus bottom,
      perimeter siding,
      an interior barrier,
      an upper lip, and
      an outlet;
   wherein the cylinder is configured to extend through an interior of the annulus and spin therein; and
   wherein the centrifugal pump system is configured to transport fluid from below the cylinder bottom, through the cylinder top and out the annulus outlet.

9. The centrifugal pump system of claim 8 wherein the plurality of angled spouts are biased in a clockwise orientation.

10. The centrifugal pump system of claim 8 wherein the central inlet surrounds the medial stabilizer.

11. The centrifugal pump system of claim 8 wherein the bowtie shaped chamber comprises end openings connected to the plurality of longitudinal channels configured to direct waterflow along the plurality of longitudinal channels.

12. The centrifugal pump system of claim 8 wherein the cylinder is configured to spin in a direction opposite the orientation of the plurality of angled spouts.

13. The centrifugal pump system of claim 8 wherein the plurality of angled spouts is connected to the plurality of longitudinal chambers at the cylinder top.

14. The centrifugal pump system of claim 8 wherein the annulus is configured to corral fluid within the circular channel and direct it through the outlet.

15. The centrifugal pump system of claim 8 wherein the plurality of longitudinal channels is positioned along the cylinder body periphery and enclosed within the cylinder.

16. The centrifugal pump system of claim 8 wherein the cylinder top ridge is configured to rest on top of the annulus interior barrier and the cylinder body is configured to fit through a central void of the annulus.

17. A centrifugal pump system comprising:
   a cylinder comprising
      a cylinder bottom including a central inlet, a medial stabilizer, and a bowtie-shaped chamber;
      a cylinder body including a plurality of longitudinal channels and a central axle; and
      a cylinder top including a top ridge with a plurality of angled spouts;
   an annulus comprising
      a circular channel, an annulus bottom,
perimeter siding,
an interior barrier,
an upper lip, and
an outlet, and
a rotational source;
wherein the rotational source is one of a manual crank assembly, a motor, ora combination of the two configured to spin the cylinder;
wherein the cylinder is configured to extend through an interior of the annulus;
wherein the bowtie-shaped chamber comprises end openings connected to the plurality of longitudinal channels configured to direct waterflow along the plurality of longitudinal channels;
wherein the plurality of angled spouts is biased in a clockwise orientation; and
wherein the centrifugal pump system is configured to transport fluid from below the cylinder bottom, through the cylinder top and out the annulus outlet.

18. The centrifugal pump system of claim 17 wherein the bowtie-shaped chamber further includes openings at opposing ends.

19. The centrifugal pump system of claim 17 wherein the plurality of angled spouts is connected to the plurality of longitudinal chambers at the cylinder top; and wherein the plurality of angled spouts is configured to direct flow into the annulus.

* * * * *